(12) United States Patent
Riederer

(10) Patent No.: US 6,815,907 B2
(45) Date of Patent: Nov. 9, 2004

(54) PULSE-WIDTH MODULATION FOR OPERATING HIGH PRESSURE LAMPS

(75) Inventor: Xaver Riederer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/140,506

(22) Filed: May 7, 2002

(65) Prior Publication Data
US 2003/0001518 A1 Jan. 2, 2003

(30) Foreign Application Priority Data
May 8, 2001 (EP) .............................................. 01111052

(51) Int. Cl.$^7$ .............................................. H05B 37/02
(52) U.S. Cl. .................................. 315/209 R; 315/247
(58) Field of Search ................................. 315/291, 307, 315/308, 209 R, 224, 225, 219, 247

(56) References Cited

U.S. PATENT DOCUMENTS

| | | | |
|---|---|---|---|
| 4,132,925 A | | 1/1979 | Schmutzer et al. .......... 315/208 |
| 5,134,345 A | * | 7/1992 | El-Hamamsy et al. ...... 315/248 |
| 5,365,151 A | | 11/1994 | Spiegel et al. .............. 315/209 |
| 5,608,294 A | | 3/1997 | Derra et al. ................. 315/224 |
| 6,097,158 A | * | 8/2000 | Manor et al. ................ 315/127 |
| 6,429,605 B1 | * | 8/2002 | Li ............................... 315/291 |
| 6,518,712 B2 | * | 2/2003 | Weng ...................... 315/209 R |

* cited by examiner

Primary Examiner—Wilson Lee

(57) ABSTRACT

A high pressure lamp is driven with a pulse width modulated, alternating current pulses having an absolute value that is substantially constant and a short term average that varies approximately sinusoidally.

10 Claims, 3 Drawing Sheets

PULSE-WIDTH MODULATION FOR OPERATING HIGH PRESSURE LAMPS

BACKGROUND

The invention relates to a method for operating a high pressure lamp, in particular for improvement of light arc stability, where an alternating current is supplied to the lamp Moreover the invention relates to a lamp current signal for provision of a high pressure lamp. The invention also relates to a circuit arrangement for providing a high pressure lamp with a lamp current. Eventually the invention also relates to the use of the method, the signal and the arrangement in several devices.

High pressure lamps, in particular High Intensity Discharge Lamps, need to be fed by appropriate currents so that the light-arc is substantially stable A method for providing a lamp with a well suited current is known from U.S. Pat. No. 5,608,294.

The method described in U.S. Pat. No. 5,608,294 aims to provide a method for operating a high pressure lamp, and a circuit arrangement for operation of a high pressure discharge lamp in such a way that flickering of the lamp during operation is substantially suppressed. To reduce flickering, it is proposed to supply an alternating lamp current to the high pressure discharge lamp, to generate a current pulse in a predetermined fraction of given half periods of the lamp current, where said current pulse has the same polarity as the lamp current and is superimposed on the lamp current only in a latter pan of the half period in which it is generated. By superimposing the current pulse on the lamp current, the temperature of the electrode is raised relatively high. The high temperature causes the discharge arc to originate from the same place on the electrode in each cathodic phase. The effect of this is a light-arc with higher stability.

The use of an extra current pulse, as described in U.S. Pat. No. 5,608,294, increases dissipation power in the circuit arrangement. Also the light output is not constant, which complicates the use of such lamps in sequential displays, which prefer a constant light stream.

Based on the above described and known method, it is an object of the invention to improve the light-arc stability. It is another object of the invention to decrease dissipation power in the circuit arrangement.

SUMMARY OF THE INVENTION

By use of a method for operating a high pressure lamp, where the absolute value of said lamp current is substantially constant, and where said alternating lamp current is pulse-width modulated, whereby the pulse-width ratio between a pulse-width of a positive pulse and a pulse-width of a negative pulse is modulated, the stability of the light-arc is improved. Also the luminous flux is virtually constant, as the lamp rating is practically constant due to the almost constant absolute value of the lamp current. Further, the dissipation power is decreased, as no extra current pulse is needed.

A high pressure lamp, such as a high pressure discharge lamp, a high intensity discharge lamp (UHP-lamp), or a high pressure gas discharge lamp (HIP-lamp), has a light-arc. According to the invention it can be ensured that the light emitted from the lamp has in general always the same luminous flux.

According to the invention, a high pressure lamp is fed by a current that has substantially a constant absolute value. The polarity of the current is alternated according to a given frequency. By that, current pulses of switching polarity are applied to the lamp. It is understood that during a switch of polarity, the absolute value of the currents cannot be constant, the current signal has an edge. Any signal form, which is applicable for the alteration of the polarity, may be applied. Possible signals are ramp signal, virtually rectangular-signals, or sawtooth signals. The signal form of the current is preferential rectangular. The pulses may also have edges with an edge steepness that can be from rectangular to ramp.

Such an alternating lamp current is then pulse-width modulated By pulse-width modulation, the width of a current pulse in either polarity can be modulated The ratio between a pulse width of a positive pulse and a pulse width of a negative pulse can thereby be adjusted When this ratio is modulated according to a given function, the stability of the light-arc can be improved.

The operation frequency according to claim 2, by which the lamp current is alternated, is preferred Above a frequency of about 5 kHz, there might be the possibility of acoustic resonance In that case the light-arc stability would deteriorate But a higher frequency might still be applicable and thus is in the scope of the invention. In case the frequency of the alternating lamp current is decreased below a certain value, approximately 40 Hz, light-arc stability may not be achieved. This frequency range is only a preferred range and does not limit the invention to that range.

A frequency range for modulation of a pulse-width ratio, as described in claim 3, is favoured. Above a value of about 100 Hz, which frequency is mainly dependent on the geometry of the electrodes, the effect of light-arc stabilization disappears. Very low frequencies, such as 0, 1 Hz, still allow an improvement of the light-arc stability. These very low frequencies may be applied in light-systems, where artifacts have to be avoided. As the light quantity emitted from the lamp differs from the pulse with positive polarity to the pulse with negative polarity, artifacts may be avoided by modulating. The signal in a way that the modulation frequency may not be perceived by humans. That can be reached with a very low modulation frequency. Again, this frequency range is only a preferred range and does not limit the invention to that range.

By synchronizing the pulse-width modulation frequency with a display frequency of a display device, artifacts, which appear on the display, may be avoided.

A signal according to claim 5 is favoured. Such a signal may be a sine, cosine, a sawtooth or any other signal. Also signals that are close to these signals may be applied.

It is preferred that the modulation amplitude can be reduced When the amplitude of the current pulses is reduced, the absolute value of the current applied to the lamp is reduced.

A lamp current signal for provision of a high pressure lamp, which polarity alternates, which absolute value is substantially constant, and which pulse-width A ratio between a pulse-width of a positive pulse and a pulse-width of a negative pulse is modulated, is another embodiment of the invention. This signal enables a high pressure lamp to emit a light signal with a substantially constant signal strength, as the light-arc is stable.

Also a circuit arrangement for providing a high pressure lamp with a lamp current, with pulse-forming means for provision of an alternating lamp current with a substantially constant absolute value, with modulation-means for modulating a pulse-width ratio between a pulse-width of a positive pulse and a pulse-width of a negative pulse is a further embodiment of the invention. The feature of this circuit arrangement is that the dissipation power within the circuit is lower than in known circuits which provide a high pressure lamp with a signal that enables a stable light-arc.

The use of a method, a lamp current signal, or a circuit arrangement, as described above, in a data- or video-projector with LCD- or mirror-displays, is another embodiment of the invention. The stable light-arc emits a constant light, which is well suited for the use in the mentioned projectors.

BRIEF DESCRIPTION OF DRAWINGS

These and other aspects of the invention will be apparent from and elucidated with reference to the embodiment described hereinafter. The figures show.

DETAILED DESCRIPTION OF INVENTION

Figure 1:
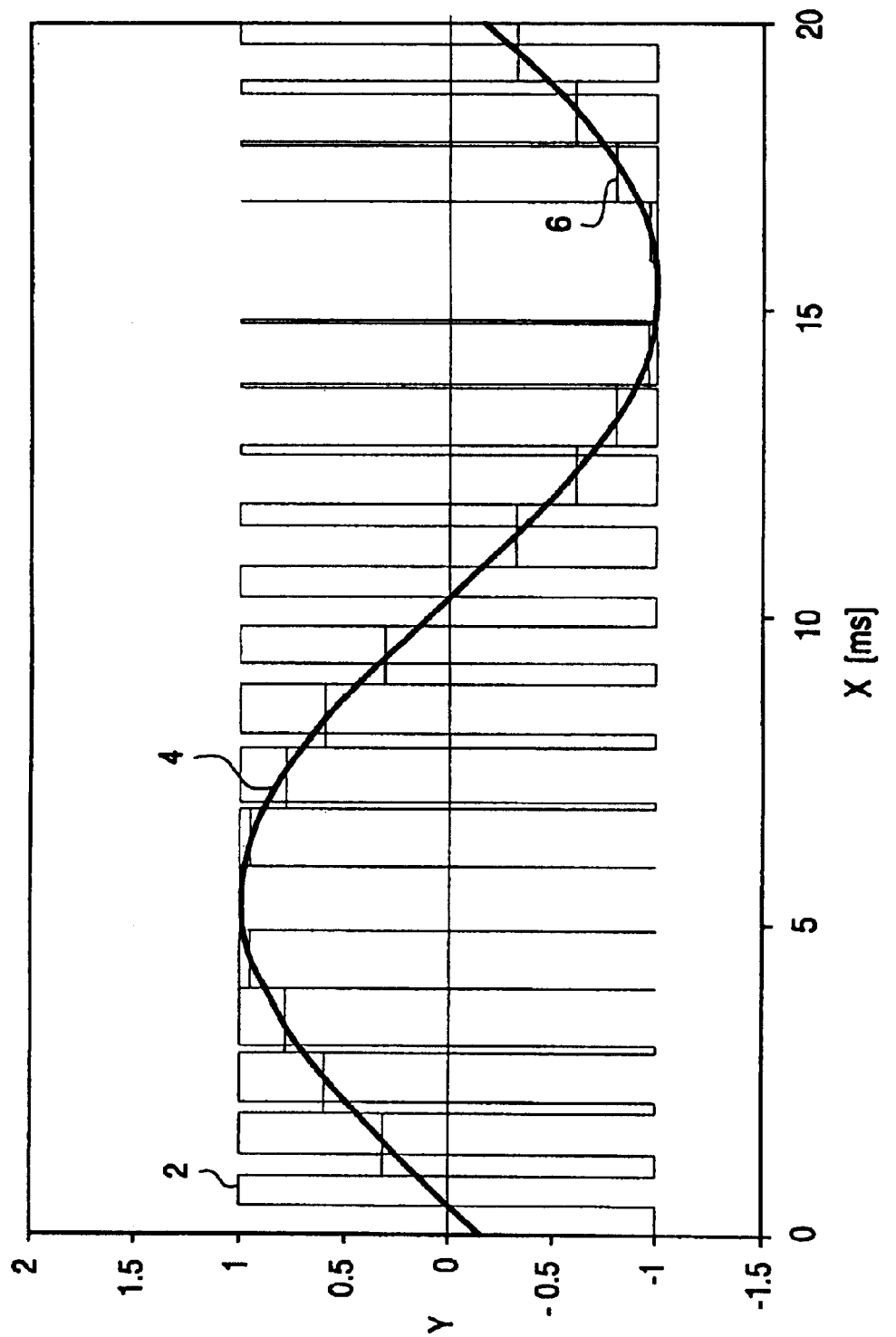
FIG. 1 tamp current as a function of time.

FIG. 1 shows a lamp current signal 2 as a function of time. Also shown in FIG. 1 is a modulation signal 4, which provides the modulation information for modulation of the pulse-width of the positive and the negative pulse of the current signal 2 A mean value 6 of the lamp current signal 2 is also shown in FIG. 1. A x-axis shows the time in milliseconds. A y-axis shows the amplitude of the lamp current signal 2, the modulation signal 4, and the mean value 6. The y-axis is scaled to 1.

The modulation signal 4 is a sine signal with a frequency of $f_s$=50 Hz. This modulation signal 4 modulates the ratio between the positive half and the negative half of the rectangular current signal 2. This current signal 2 has a frequency of $f_G$=1 kHz. The absolute value of the current signal 2 is always 1. In case the modulation signal 4 is positive, the positive half of the current signal 4 lasts longer than the negative half of the current signal 4. That also results in the fact that the mean value 6 of the current signal 4 is positive, when the modulation signal is positive and negative, when the modulation signal is negative.

The absolute value of the current signal 4 $I_{Lamp}$ is defined by the voltage of the lamp $U_{Lamp}$ and the lamp power $P_{Lamp}$ as $$I_{Lamp} = \frac{P_{Lamp}}{U_{Lamp}}.$$

Figure 2:
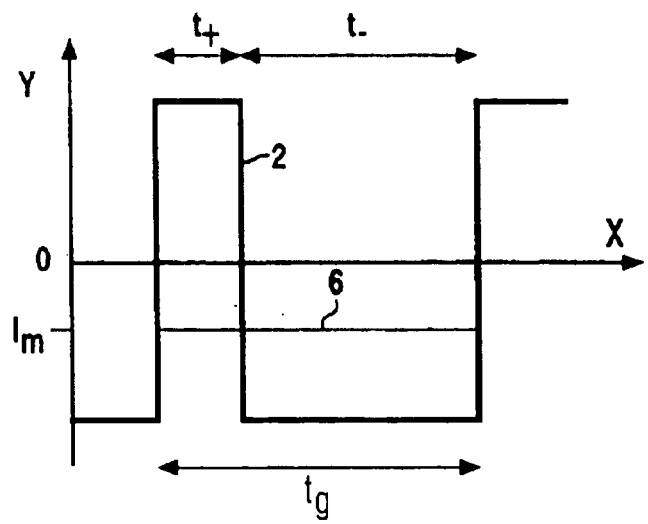
FIG. 2 lamp current as a function of time.

From FIG. 2, the ratio between a positive pulse $t_+$, and a negative pulse $t_-$, of the current signal 4 can be seen more clearly The mean value 6 $I_m$ is within one period $$t_{G1}\left(t_G = \frac{1}{f_G}\right),$$

and ($t_G=t_++t_-$), of the current signal 2 defined as $$I_m = I_{Lamp} \cdot \frac{(t_+ - t_-)}{t_G}$$

That means that the mean value 6 has to be within the maximum positive and maximum negative value of the current signal 2. The mean value 6 can be defined as m·$I_{Lamp}$ with m∈[−1;+1], where m can be defined as modulation degree. The duration, e.g. the pulse width, of each period $t_+$ and $t_-$ then is:

$$t_+ = \frac{1+m}{2}t_G \quad t_- = \frac{1-m}{2}t_G$$

The duration of the periods $t_+$ and $t_-$ differ with the modulation signal 4. The pulse width, e.g. the duration of the periods $t_+$ and $t_-$, are defined by the modulation signal 4. In this case, the modulation signal is a sine signal $$M \cdot \sin\left(2\pi \frac{t}{f_s}\right)$$

with the modulation frequency $f_s$=50 Hz and a modulation amplitude M. The ratio for the pulse-width modulation can he calculated from the modulation signal 4 by $$m_i = M \cdot \sin\left(2\pi \frac{f_s}{f_G}i\right),$$

where i is an index which is increased by one. For variation of the light-arc, the frequency of the current signal $f_G$, the frequency of the modulation signal $f_s$, the modulation signal (e.g. sine, cosine, rectangular, sawtooth), and the modulation amplitude M can be varied. In FIG. 1 the modulation amplitude is 0.8.

Figure 3:
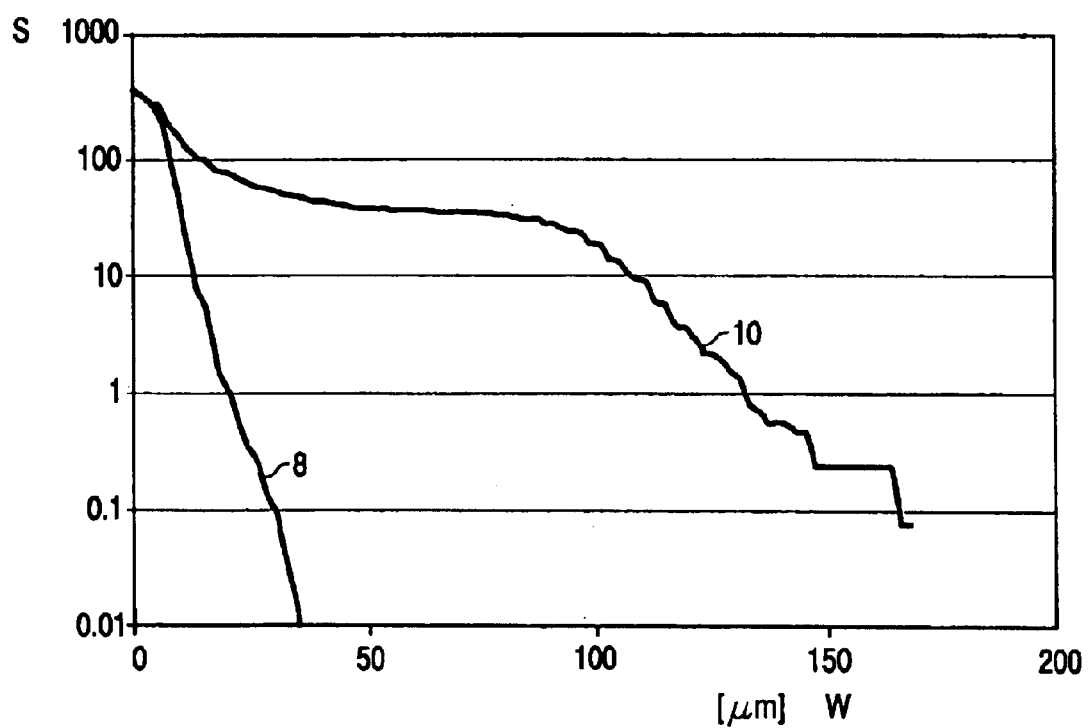
FIG. 3 cumulative distribution of arc-jumps per operating hour for operation with pulse-width modulation and for standard operation.

The effect of applying a high pressure lamp with a current signal 2 shown in FIGS. 1 and 2 can be seen in FIG. 3. In FIG. 3 the W-axis shows the distance of an arc jump, the S-axis shows the cumulative amount of detected arc-jumps L. Distribution 10 shows the distribution of arc-jumps in a lamp which is fed by a conventional lamp current, distribution 8 shows the distribution of arc-jumps in a lamp which is fed by a lamp current according to the invention. As can be seen, in comparison to a conventional lamp, only few arc-jumps with long jump distance can be detected. That has the effect, that the light, which can be collected onto the display stays constant.

The above described embodiment is only one possible solution. The effect of a reduction of light-arcs jumps in combination with a constant luminous flux and a low dissipation power can be, according to the invention, achieved with further modulation signals and current frequencies.

Figure 4:
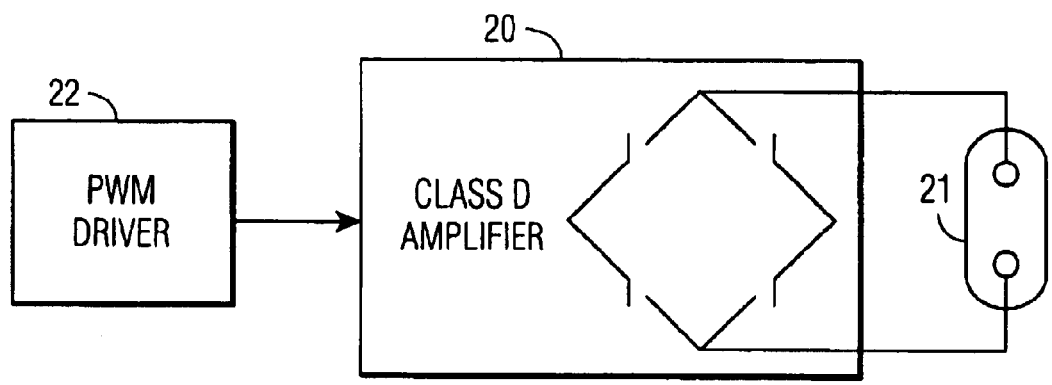
FIG. 4 apparatus constructed in accordance with the invention.

FIG. 4 illustrates apparatus for implementing the invention. Class D amplifier 20 provides alternating current pulses to high pressure lamp 21. The pulses are pulse width modulated by driver 22 to produce a mean, described above, that approximates a sine wave.

Figure 5:
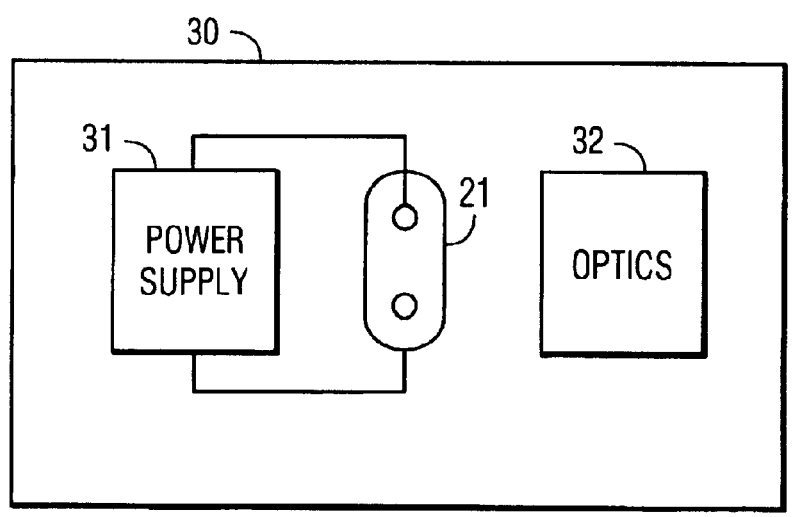
FIG. 5 projector or display apparatus including a high pressure lamp driven in accordance with the invention.

A lamp driven in accordance with the invention is particularly suited for display applications because of the relatively constant luminosity of such a lamp. As illustrated in FIG. 5, device 30 includes power supply 31 driving lamp 21 with pulse width modulated, alternating current pulses. Optics 32, such as an LCD or mirror display, collects the light for viewing or projection.

What is claimed as the invention is:

1. A method for operating a high pressure lamp, said method comprising the steps of:
    coupling the lamp to a class D amplifier producing alternating current pulses at a first frequency;
    pulse width modulating the pulses at a second frequency;
    wherein the second frequency is lower than the first frequency; and
    wherein each positive pulse has a duration t+ and each negative pulse has a duration t−, and the period of the first frequency is (t++t−).

2. The method as set forth in claim 1 wherein the first frequency is between approximately 40 Hz and 5 kHz.

3. The method as set forth in claim 1 wherein the second frequency is between approximately 0.1 Hz and 100 Hz.

4. The method as set forth in claim 1 and further including the step of synchronizing the second frequency with the display frequency of a display device.

5. The method as set forth in claim 1 wherein the first frequency is a harmonic of the second frequency.

6. The method as set forth in claim 1 wherein the amplitude of the pulse width modulation is larger than zero.

7. The method as set forth in claim 1 wherein the absolute values of the pulses are substantially constant.

8. Apparatus for operating a high pressure lamp, said apparatus comprising:
    a class D amplifier producing alternating current pulses at first frequency within the approximate range of 40 Hz to 5,000 Hz;
    a driver coupled to said amplifier for pulse width modulating said pulses at a second frequency within the approximate range of 0.1 Hz to 100 Hz;
    wherein the mean values of the pulses during each period of said first frequency approximate a sinusoidal signal at said second frequency.

9. A projector including a high pressure lamp, optics for controlling light emitted by the lamp, and a circuit for providing power to the lamp, wherein the circuit comprises:
    a class D amplifier producing alternating current pulses at a first frequency;
    a driver coupled to said amplifier for pulse width modulating said pulses at a second frequency;
    wherein said second frequency is lower than said first frequency; and
    wherein each positive pulse has a duration t+ and each negative pulse has a duration t−, and the period of the first frequency is (t++t−).

10. The apparatus as set forth in claim 8 wherein the absolute values of said pulses are substantially constant.

* * * * *